United States Patent
Haridas et al.

(10) Patent No.: US 9,438,628 B2
(45) Date of Patent: Sep. 6, 2016

(54) APPARATUS AND METHOD FOR SECURING A DISTRIBUTED CONTROL SYSTEM (DCS)

(71) Applicant: Honeywell International Inc., Morristown, NJ (US)

(72) Inventors: Harshal S. Haridas, Jamison, PA (US); Alexander Chernoguzov, Warrington, PA (US)

(73) Assignee: Honeywell International Inc., Morris Plains, NJ (US)

( * ) Notice: Subject to any disclaimer, the term of this patent is extended or adjusted under 35 U.S.C. 154(b) by 36 days.

(21) Appl. No.: 14/308,946

(22) Filed: Jun. 19, 2014

(65) Prior Publication Data
US 2015/0215338 A1   Jul. 30, 2015

Related U.S. Application Data

(60) Provisional application No. 61/932,152, filed on Jan. 27, 2014.

(51) Int. Cl.
*H04L 9/12* (2006.01)
*H04L 29/06* (2006.01)

(52) U.S. Cl.
CPC .......... *H04L 63/20* (2013.01); *H04L 63/0823* (2013.01); *H04L 63/18* (2013.01); *H04L 63/0281* (2013.01)

(58) Field of Classification Search
CPC .... H04L 63/20; H04L 63/08; H04L 63/0281
USPC ............................................................ 726/1
See application file for complete search history.

(56) References Cited

U.S. PATENT DOCUMENTS

| | | | | |
|---|---|---|---|---|
| 6,560,656 | B1 * | 5/2003 | O'Sullivan ........... | G06F 9/4416 709/220 |
| 2003/0061481 | A1 * | 3/2003 | Levine ................ | H04L 9/0836 713/163 |

(Continued)

OTHER PUBLICATIONS

Croft et al. RFC 951, Internet Engineering Task Force, 1985, pp. 1-12.*

(Continued)

*Primary Examiner* — Kaveh Abrishamkar
*Assistant Examiner* — Thomas Ho (57) ABSTRACT

A method includes receiving, at a first distributed control system (DCS) node over a network, information associated with a security manager. The method also includes establishing multiple communication channels between the first DCS node and the security manager over the network using the information, where the communication channels include a non-secure channel and a secure channel. The method further includes receiving security credentials from the security manager at the first DCS node over the non-secure channel and receiving a security policy and an activation time from the security manager at the first DCS node over the secure channel. In addition, the method includes transitioning the first DCS node to communicate with a second DCS node over the network using the security policy at the activation time.

20 Claims, 4 Drawing Sheets

(56) References Cited

U.S. PATENT DOCUMENTS

| | | | |
|---|---|---|---|
| 2003/0088650 A1 | 5/2003 | Fassold et al. | |
| 2005/0256735 A1* | 11/2005 | Bayne | G06Q 10/0639 705/7.38 |
| 2006/0282876 A1* | 12/2006 | Shelest | G06F 21/6218 726/1 |
| 2009/0177289 A1 | 7/2009 | Glanzer et al. | |
| 2010/0161817 A1* | 6/2010 | Xiao | H04L 63/126 709/229 |
| 2011/0231450 A1* | 9/2011 | Sinha | G06F 17/30566 707/802 |
| 2012/0174182 A1 | 7/2012 | Neely | |
| 2013/0111211 A1 | 5/2013 | Winslow et al. | |
| 2014/0007253 A1 | 1/2014 | Hardt | |

OTHER PUBLICATIONS

Alexander et al., RFC 2132, Internet Engineering Task Force, 1997, pp. 1-34.*
"IPsec", www.wikipedia.org, Jun. 15, 2014, 10 pages.
"Bootstrap Protocol", www.wikipedia.org, Mar. 16, 2014, 3 pages.
International Search Report dated Apr. 28, 2015 in connection with International Patent Application No. PCT/US2015/011937, 5 pages.
Written Opinion of International Searching Authority dated Arpil 28, 2015 in connection with International Patent Application No. PCT/US2015/011937, 6 pages.

* cited by examiner

APPARATUS AND METHOD FOR SECURING A DISTRIBUTED CONTROL SYSTEM (DCS)

CROSS-REFERENCE TO RELATED APPLICATION AND PRIORITY CLAIM

This application claims priority under 35 U.S.C. §119(e) to U.S. Provisional Patent Application No. 61/932,152 filed on Jan. 27, 2014. This provisional patent application is hereby incorporated by reference in its entirety.

TECHNICAL FIELD

This disclosure relates generally to industrial process control and automation systems. More specifically, this disclosure relates to an apparatus and method for securing a distributed control system (DCS).

BACKGROUND

Industrial process control and automation systems are often used to automate large and complex industrial processes. These types of systems routinely include sensors, actuators, and controllers. The controllers typically receive measurements from the sensors and generate control signals for the actuators.

Industrial process control and automation systems have evolved from using obscure proprietary technologies to using commercial off-the-shelf (COTS) networking components and equipment. Unfortunately, the use of COTS technology has brought many security challenges with it that have not been addressed in the normal evolution process of the control and automation systems. As a result, industrial process control and automation systems are vulnerable to illicit access and use, such as by hackers who can gain access to communication networks used in distributed control systems.

SUMMARY

This disclosure provides an apparatus and method for securing a distributed control system (DCS).

In a first embodiment, a method includes receiving, at a first DCS node over a network, information associated with a security manager. The method also includes establishing multiple communication channels between the first DCS node and the security manager over the network using the information, where the communication channels include a non-secure channel and a secure channel. The method further includes receiving security credentials from the security manager at the first DCS node over the non-secure channel and receiving a security policy and an activation time from the security manager at the first DCS node over the secure channel. In addition, the method includes transitioning the first DCS node to communicate with a second DCS node over the network using the security policy at the activation time.

In a second embodiment, an apparatus includes a first DCS node having at least one interface and at least one processing device. The at least one interface is configured to receive over a network information associated with a security manager. The at least one processing device is configured to establish multiple communication channels including a non-secure channel and a secure channel between the first DCS node and the security manager over the network using the information. The at least one processing device is also configured to receive security credentials from the security manager over the non-secure channel via the at least one interface and receive a security policy and an activation time from the security manager over the secure channel via the at least one interface. The at least one processing device is further configured to transition the at least one interface to communicate with a second DCS node over the network using the security policy at the activation time.

In a third embodiment, a non-transitory computer readable medium embodies a computer program. The computer program includes computer readable program code for receiving, at a first DCS node over a network, information associated with a security manager. The computer program also includes computer readable program code for establishing multiple communication channels between the first DCS node and the security manager over the network using the information, where the communication channels include a non-secure channel and a secure channel. The computer program further includes computer readable program code for receiving security credentials from the security manager at the first DCS node over the non-secure channel and for receiving a security policy and an activation time from the security manager at the first DCS node over the secure channel. In addition, the computer program includes computer readable program code for transitioning the first DCS node to communicate with a second DCS node over the network using the security policy at the activation time.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
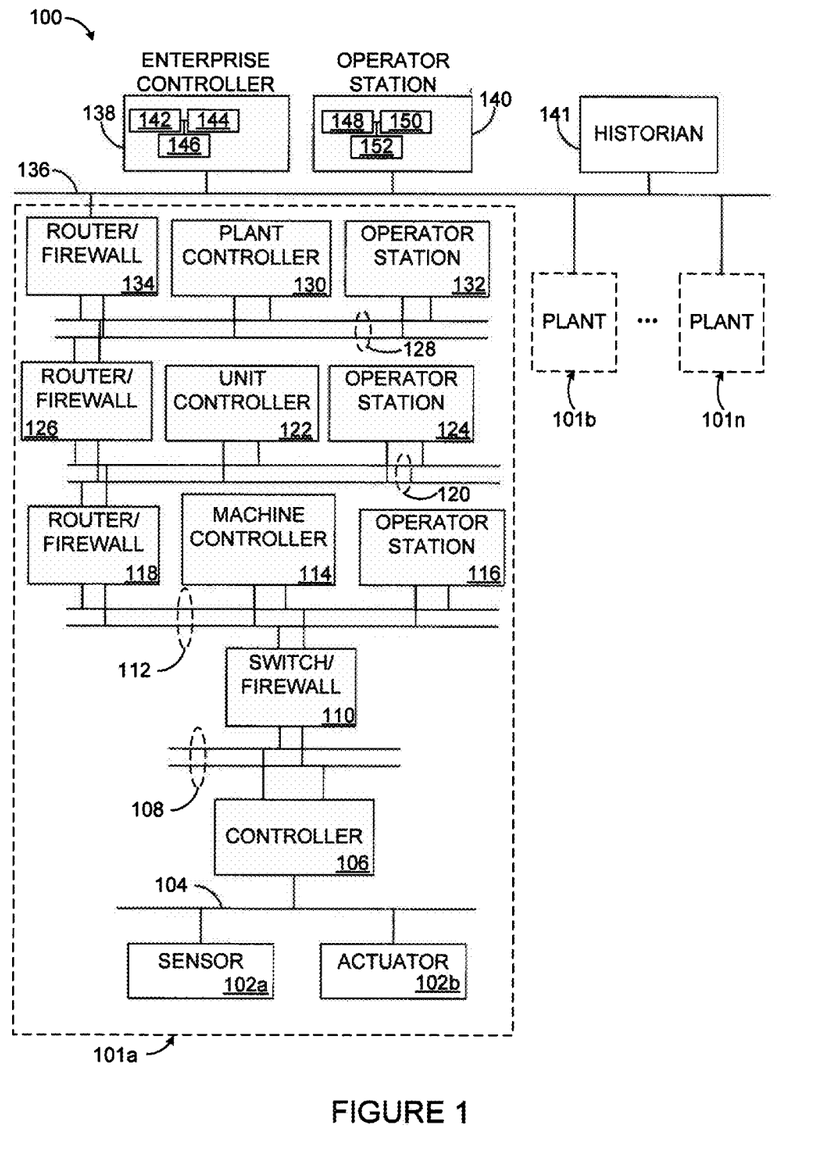
FIGS. 1 and 2 illustrate an example industrial process control and automation system and related details according to this disclosure.
Figure 2:
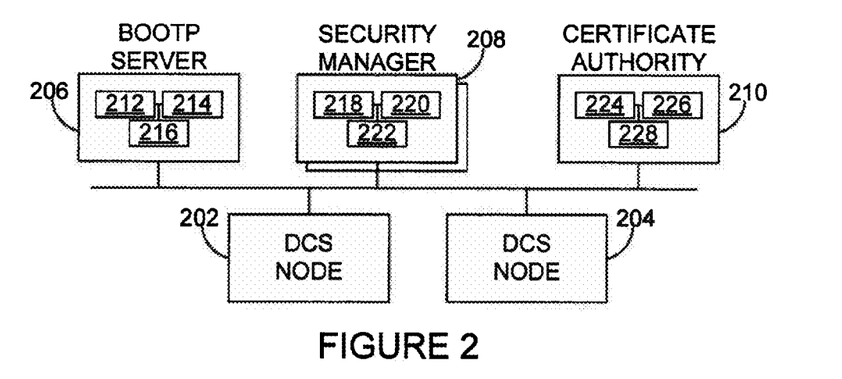

FIGS. 1 and 2 illustrate an example industrial process control and automation system 100 and related details according to this disclosure. As shown in FIG. 1, the system 100 includes various components that facilitate production or processing of at least one product or other material. For instance, the system 100 is used here to facilitate control over components in one or multiple plants 101*a*-101*n*. Each plant 101*a*-101*n* represents one or more processing facilities (or one or more portions thereof), such as one or more manufacturing facilities for producing at least one product or other material. In general, each plant 101*a*-101*n* may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As described above, conventional industrial process control and automation systems are often vulnerable to illicit access and use. In various embodiments, this disclosure employs the use of bootstrap protocol (BOOTP) extensions, canned policies applications, node-to-node negotiations, and subnetwork routing to secure a distributed control system (DCS) while maintaining availability and protecting network communications. This functionality can be implemented in any of the nodes shown in FIG. 1, such as in any of the controllers or operator stations of FIG. 1. In particular embodiments, this functionality can be implemented in the controllers or operator stations below Level 3 of the industrial process control and automation system 100.

Details of this functionality are shown in FIG. 2, where communications between two DCS nodes 202-204 can be protected as described below. The DCS nodes 202-204 could represent any suitable devices in a DCS, such as any of the controllers or operator stations shown in FIG. 1.

Also shown in FIG. 2 are a BOOTP server 206, a security manager 208, and a certificate authority (CA) 210. As described in more detail below, the BOOTP server 206 supports the use of a bootstrap protocol extension, which allows the BOOTP server 206 to inform the DCS nodes 202-204 of the network address and ports of the security manager 208. The DCS nodes 202-204 can communicate with the security manager 208 via both open and encrypted channels using the information from the BOOTP server 206. The security manager 208 operates to maintain information about DCS nodes that have been configured or are in the process of being configured to support secure communications between the DCS nodes 202-204. The security manager 208 also provides security credentials (such as certificates) to the DCS nodes 202-204, allowing the DCS nodes 202-204 to communicate securely with one another. The certificate authority 210 generates the certificates or other security credentials provided by the security manager 208. More detailed descriptions of the operations of the BOOTP server 206, security manager 208, and certificate authority 210 in conjunction with the DCS nodes 202-204 are provided below.

The BOOTP server 206 includes any suitable structure supporting use a bootstrap protocol. For example, the BOOTP server 206 could include one or more processing devices 212 and one or more memories 214 for storing instructions and data used, generated, or collected by the processing device(s) 212. The BOOTP server 206 could also include at least one network interface 216, such as one or more Ethernet interfaces or wireless transceivers.

The security manager 208 includes any suitable structure for providing security credentials to DCS nodes. For instance, the security manager 208 could include one or more processing devices 218 and one or more memories 220 for storing instructions and data used, generated, or collected by the processing device(s) 218. The security manager 208 could also include at least one network interface 222, such as one or more Ethernet interfaces or wireless transceivers. There could be one or multiple security managers 208 in the system, such as one security manager 208 per unit-level controller 122.

The certificate authority 210 includes any suitable structure for generating security credentials. For example, the certificate authority 210 could include one or more processing devices 224 and one or more memories 226 for storing instructions and data used, generated, or collected by the processing device(s) 224. The certificate authority 210 could also include at least one network interface 228, such as one or more Ethernet interfaces or wireless transceivers.

The BOOTP server 206, security manager 208, and certificate authority 210 could be used at any suitable level(s) in the industrial process control and automation system 100. For example, in some embodiments, the BOOTP server 206, security manager 208, and certificate authority 210 could represent Level 3, Level 4, or Level 5 components and used to secure DCS nodes at Level 1, Level 2, or Level 3 of the system 100.

Although FIGS. 1 and 2 illustrate one example of an industrial process control and automation system 100 and related details, various changes may be made to FIGS. 1 and 2. For example, a control and automation system could include any number of sensors, actuators, controllers, operator stations, networks, DCS nodes, BOOTP servers, security managers, and CAs. Also, the makeup and arrangement of the system 100 in FIGS. 1 and 2 are for illustration only.

Components could be added, omitted, combined, or placed in any other suitable configuration according to particular needs. As a particular example, two or more of the BOOTP server 206, security manager 208, and certificate authority 210 could be combined into a single functional unit. Further, particular functions have been described as being performed by particular components of the system 100. This is for illustration only. In general, process control and automation systems are highly configurable and can be configured in any suitable manner according to particular needs. In addition, FIGS. 1 and 2 illustrate an example environment in which a DCS can be secured. This functionality can be used in any other suitable device or system.

Figure 3:
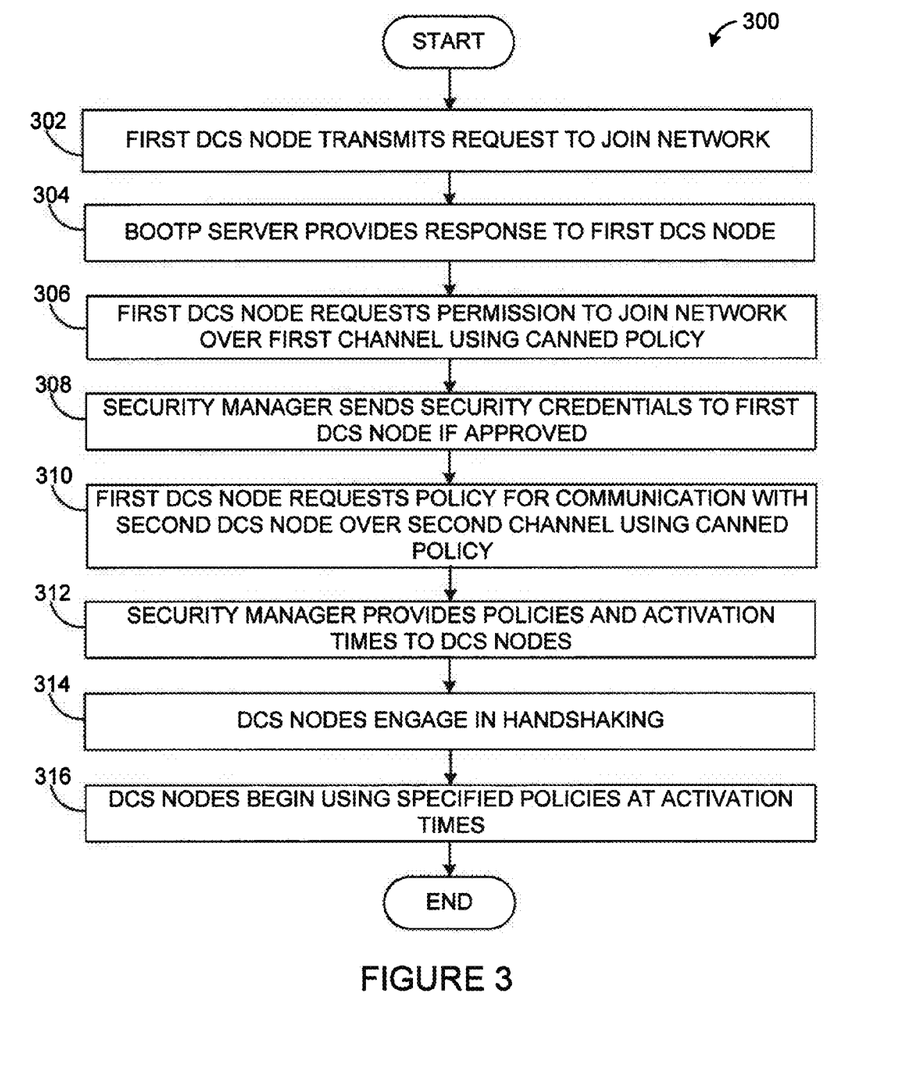
FIG. 3 illustrates an example method for securing a distributed control system (DCS) according to this disclosure.

FIG. 3 illustrates an example method 300 for securing a DCS according to this disclosure. For ease of explanation, the method 300 is described with respect to the components 202-210 of FIG. 2 operating in the system 100 of FIG. 1. The method 300 could be used with any other suitable components in any suitable system. During the explanation of FIG. 3, reference is made to FIG. 4, which illustrates an example signaling diagram 400 for securing a DCS according to this disclosure. Again, for ease of explanation, the signaling diagram 400 is described with respect to the components 202-210 of FIG. 2 operating in the system 100 of FIG. 1. The signaling diagram 400 could be used with any other suitable components in any suitable system. Note that while the DCS nodes 202-204 are shown in FIG. 4 as representing embedded controllers, the DCS nodes 202-204 could represent any other suitable DCS devices.

Figure 4:
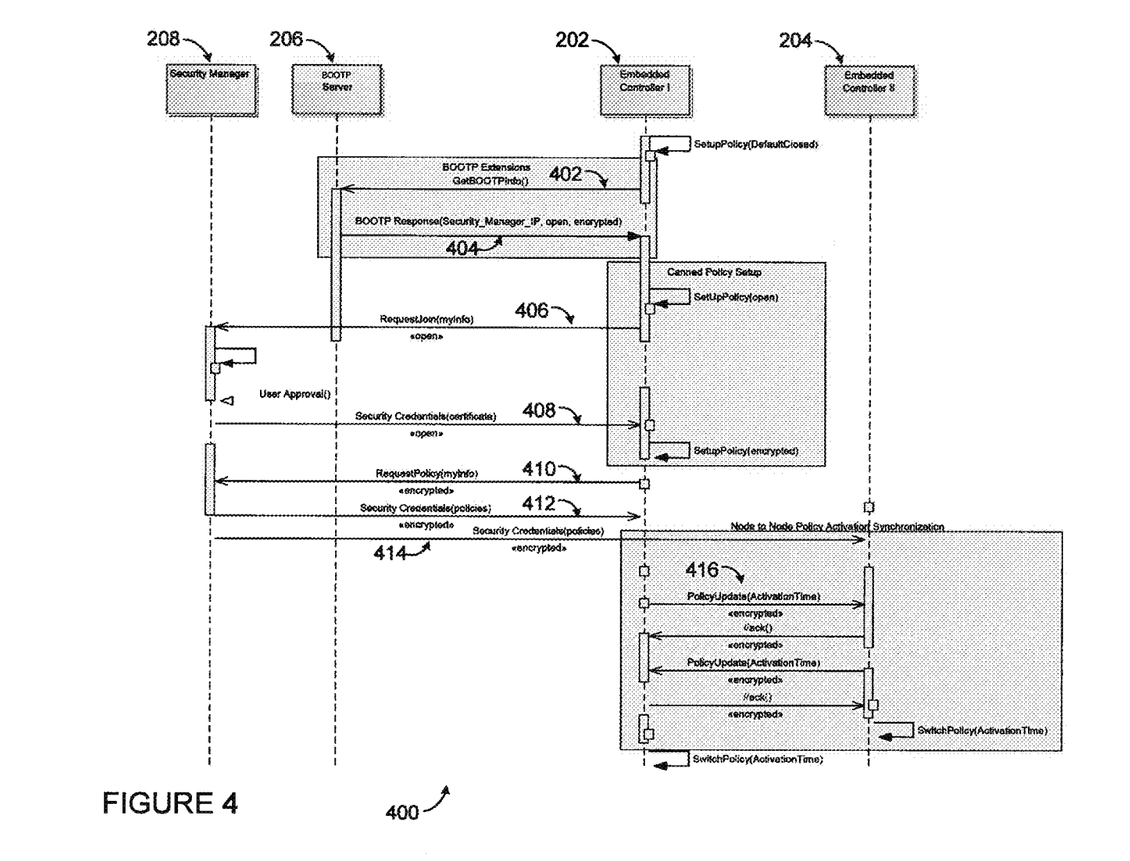
FIG. 4 illustrates an example signaling diagram for securing a DCS according to this disclosure.

The following terms and phrases are used in the description of FIGS. 3 and 4.

Security agent: a component executed or otherwise operating on a DCS node that enables the DCS node to communicate securely.
  Policy agent (PA): another name for a security agent.
  Policy decision point (PDP): another name for a security manager.
  Security manager proxy: an application proxy/component that routes security credentials when direct security agent-security manager communications are not possible.
  Security credentials: information (such as a certificate and policies) that establishes an identity of a DCS node.
  Certificate: an entity that a node uses to authenticate during establishment of a secure communication session.
  Policy: a level of secure communication intended between two DCS nodes.

As noted above, a conventional DCS node is often designed using COTS networking components and equipment. One drawback of this design is that it lacks an out-of-band mechanism to distribute security credentials and enable a DCS node to communicate securely. This design therefore lacks a mechanism for protecting information communicated over a network. Upgrading nodes to include secure communication capabilities often requires disconnecting the nodes, which typically results in an unacceptably large amount of plant downtime and unacceptably large costs to customers (making it an unattractive proposition).

The technique described below allows the same communication network to be used in order to securely deliver security credentials to a DCS node and then transition the DCS node from non-secure communications to secure communications while maintaining control availability. The technique shown in FIGS. 3 and 4 describes the manner in which a DCS node is secured.

As shown in FIG. 3, a first DCS node transmits a request to join a DCS network at step 302. This could include, for example, the DCS node 202 transmitting a BOOTP request to the BOOTP server 206. Transmission of the BOOTP request could occur at any suitable time(s), such as when the DCS node 202 is commissioned in the network. The BOOTP server provides a response to the request at step 304. This could include, for example, the BOOTP server 206 providing a BOOTP response to the DCS node 202.

An example of this is shown in FIG. 4, where the DCS node 202 transmits a BOOTP request 402 to the BOOTP server 206 and the BOOTP server 206 transmits a BOOTP response 404 to the DCS node 202.

The BOOTP protocol allows pre-defined and vendor-specific extensions to be included in both BOOTP requests and BOOTP responses. The BOOTP packet structure is described in RFC951, and the coding standard for including extensions is described in RFC2132. In some embodiments, these recommendations are used in the system 100 and in the method 300. In particular embodiments, the following extensions can be supplied to DCS nodes by the BOOTP server 206 in order to distribute information allowing the DCS nodes' security agents to set up canned policies and retrieve security credentials from the security manager 208.

TABLE 1

BOOTP Extensions

| Code | Bits 1-4 | Bits 5-8 | Bits 9-10 | Bits 11-12 | Bits 13-14 | Bits 15-16 |
|---|---|---|---|---|---|---|
| 242 | Primary PDP IP | Alternate PDP IP | PDP clear-text port | PDP encrypted port | PA clear-text port | PA encrypted port |

In Table 1, the primary PDP IP field represents the IP address of the primary security manager 208, while the alternate PDP IP field represents the IP address of the alternate security manager 208. The PDP clear-text (open) port identifies the port number used by the security manager(s) 208 to send and receive clear-text messages, and the PDP encrypted port identifies the port number used by the security manager(s) 208 to send and receive encrypted messages. The PA clear-text (open) port identifies the port number used by the PA (DCS node) to send and receive clear-text messages, and the PA encrypted port identifies the port number used by the PA (DCS node) to send and receive encrypted messages.

Returning to FIG. 3, once the first DCS node has obtained the BOOTP response, the first DCS node requests permission to join the DCS network over a first channel using a canned policy at step 306. This could include, for example, the DCS node 202 transmitting a request to join the DCS network to at least one security manager 208. The request could be routed to the security manager(s) 208 over an open or unencrypted channel using the network address(es) and port number(s) of the security manager(s) 208 identified in the BOOTP response. The security manager responds to the join request by sending security credentials to the first DCS node (if the join request is approved) at step 308. This could include, for example, at least one security manager 208 providing a certificate to the DCS node 202 over an open or unencrypted channel using the network address and port number of the PA (DCS node 202) contained in the BOOTP response. In some embodiments, the join request requires user approval before a DCS node is allowed to join the DCS network. This can help to ensure that nodes are only allowed to join the DCS network when a human operator approves the join requests. However, other approaches for controlling the nodes joining a DCS network could also be used.

An example of this is shown in FIG. 4, where the DCS node 202 transmits a join request 406 to the security manager 208 and receives a response 408 containing security credentials from the security manager 208. Both the request 406 and the response 408 can be sent over an unencrypted channel.

Returning to FIG. 3, once the first DCS node has obtained the security credentials, the first DCS node requests a policy for communicating with a second DCS node over a second channel using another canned policy at step 310. This could include, for example, the DCS node 202 transmitting a request for a communication policy to at least one security manager 208. The request could be routed to the security manager(s) 208 over an encrypted channel that is set up using the security credentials. The security manager responds to the policy request by sending communication policies and activation time(s) to both the first and second DCS nodes at step 312. This could include, for example, at least one security manager 208 providing the policies and activation time(s) to the DCS nodes 202-204 over encrypted channels.

An example of this is shown in FIG. 4, where the first DCS node 202 transmits a policy request 410 to the security manager 208 and first and second DCS nodes 202-204 respectively receive responses 412-414 from the security manager 208. The responses 412-414 can include the communication policies and the activation time(s) at which the DCS nodes 202-204 can begin using the policies to communicate with one another.

As noted above, the first DCS node 202 can use canned policies to communicate with the security manager(s) 208. Canned policies setup allows a DCS node to set up one or more independent channels for agent-manager communications using predefined policies, at which point the DCS node can receive and use different policies. In some embodiments, two channels can be setup, one for open/clear-text (unencrypted) communications and another for encrypted/secure communications. This allows the agent and manager to communicate both non-secure information (such as node certificates and unsigned CA certificates) and secure information (such as node-to-node policies applicable to control and I/O data or policy activation time(s)) to each other. For example, an agent (such as the DCS node 202), upon receipt of the BOOTP response 404, can set up the following local policies.

TABLE 2

Canned Policies (Open Communication)

| Policy Name | Source Node | Source Port | Target Node | Target Port | Communication Level |
|---|---|---|---|---|---|
| Security Manager Open | Itself | PA clear-text port | Primary PDP IP | PDP clear-text port | Encrypted Communication |
| Security Manager Alternate Open | Itself | PA clear-text port | Alternate PDP IP | PDP clear-text port | Open Communication |

The join request 406 can be sent to the security manager 208, and the security manager's response 408 can include the node and CA certificates. Upon receipt of these certificates, the agent can set up the following policy.

TABLE 3

Canned Policies (Encrypted Communication)

| Policy Name | Source Node | Source Port | Target Node | Target Port | Communication Level |
|---|---|---|---|---|---|
| Security Manager Encrypted | Itself | PA encrypted port | Any | PA encrypted port | Encrypted Communication |

The canned policy setup can be completed when both channels (open and encrypted) are set up. Subsequent updates to node security credentials can be communicated over the encrypted channel.

Once both DCS nodes have the policies and activation time(s), the DCS nodes engage in handshaking with one another at step 314 and begin using the specified policies at the specified activation time(s) at step 316. This could include, for example, the DCS nodes 202-204 engaging in a four-way handshake to verify that both DCS nodes 202-204 are prepared to transition to the new policies at the desired activation time(s) and to adjust the activation time(s) if needed. An example of this is shown in FIG. 4, where the DCS nodes 202-204 engage in a handshaking process 416, and each node 202-204 switches to using its specified policy at its specified activation time. Note, however, that other handshaking techniques could also be used.

Node-to-node policy activation time synchronization helps to ensure that each DCS node 202-204 receives a policy and subsequently transitions to the new policy, such as after a successful four-way handshake. This also helps to maintain each node's availability and avoid error conditions that may result from premature activation of a policy. The ports used between security agents (DCS nodes 202-204) can form an encrypted channel since there is a security risk if the activation time for a policy can be modified on a clear channel. Other approaches are possible.

In a pure time-based activation approach, a security manager 208 distributes policies and policy activation times to DCS nodes as the nodes are accepted to join the DCS network securely. However, due to multiple environmental factors (such as network delivery failures or delays or time synchronization problems), the policies may not be delivered to certain DCS nodes, which could result in a loss of node availability for an extended period of time. Recovery from this type of situation could require either attempting the policy delivery again or revoking policies that have already been delivered.

Node-to-node policy activation can also be done with a two-way or three-way handshake communication between security agents. In a two-way handshake communication, each agent can communicate its policy activation intent by sending a message asynchronously to its peer agent. However, a single packet drop or delay in this two-way exchange can result in a premature activation of a policy and a loss of node availability. A three-way handshake could be similar to a TCP SYN-SYNACK-ACK handshake. However, unlike in TCP where there are defined client and server roles, policy activation can involve a situation where both agents end up being clients and servers. Hence, if a three-way handshake is initiated by each DCS node concurrently, a single agent may end up prematurely activating its policy. Additionally, a single packet drop (particularly the last ACK) could result in an activation of a policy only on a single agent node.

A four-way handshake can be used to overcome premature activation as result of a single packet drop. It can also be used to adjust an activation time, which is not possible in a pure-time based activation. Upon receipt of its policy, a first agent (such as the DCS node 202) initiates a 'PolicyUpdate(ActivationTime)' message to its peer agent (such as the DCS node 204), and the second agent acknowledges the receipt of this message. Similarly and asynchronously, upon receipt of its policy, the second agent (such as the DCS node 204), initiates a 'PolicyUpdate(ActivationTime)' message to its peer agent (such as the DCS node 202), and the first agent acknowledges receipt of that message. Subsequent to these handshakes, the two PAs deploy and activate their policies per the agreed-upon 'ActivationTime'. In some embodiments, the agents on individual DCS nodes 202-204 can transition to and activate their policies when the conditions below are satisfied:

(1) The node receives an acknowledgement (ACK) for a 'PolicyUpdate' message it has initiated, which is indicative that the other node has knowledge of the policy and the activation time;
(2) The node receives a 'PolicyUpdate' message initiated by the other node; and
(3) The activation time is reached.

The benefit of a four-way handshake is that policies are activated only when three or more packets have successfully been exchanged. Hence, there is no premature activation of policies when one or two packets are dropped, unlike in the other schemes.

Although FIG. 3 illustrates one example of a method 300 for securing a DCS, various changes may be made to FIG. 3. For example, while shown as a series of steps, various steps in FIG. 3 could overlap, occur in parallel, occur in a different order, or occur any number of times. Although FIG. 4 illustrates one example of a signaling diagram 400 for securing a DCS, various changes may be made to FIG. 4. For instance, any other signaling could be used to support the functions described above.

Figure 5:
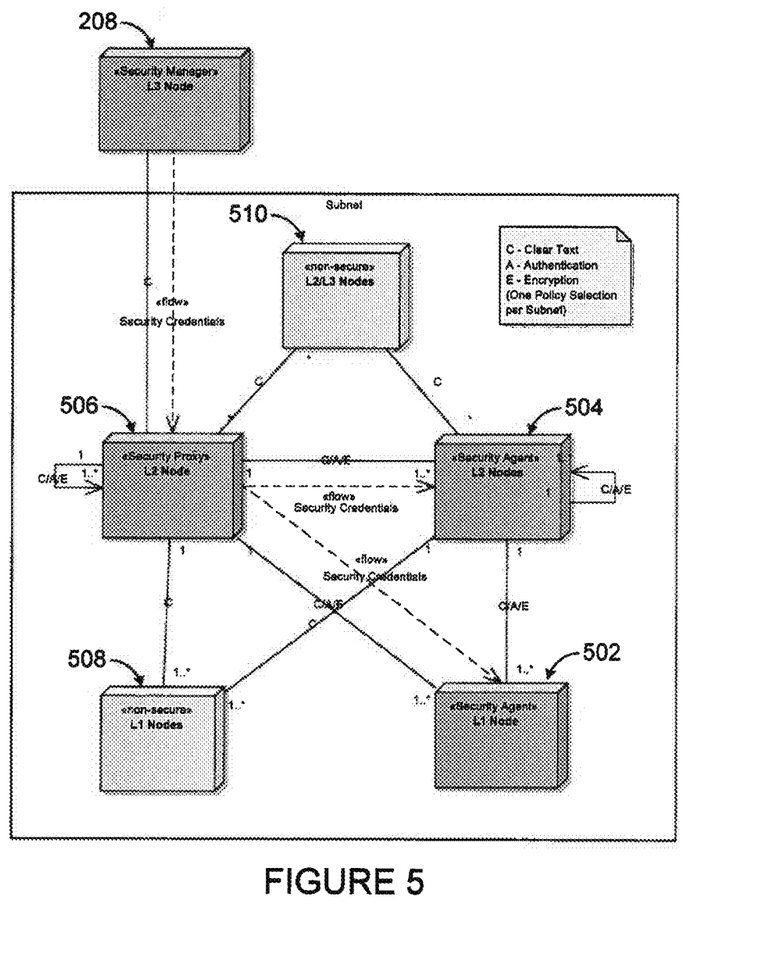
FIG. 5 illustrates an example technique for routing security policies across subnetworks to support securing of a DCS according to this disclosure.

FIG. 5 illustrates an example technique for routing security policies across subnetworks to support securing of a DCS according to this disclosure. In some embodiments, agent-manager communications may not be direct and possible under all situations, such as when subnetworks are used and communications across different levels are required. As a result, security credentials can be routed through a manager proxy to an agent when no direct communication is possible. FIG. 5 shows one example way in which security credentials can be routed using a proxy across different levels (as defined by the Purdue model for control hierarchy) and when the security manager 208 is in a different subnetwork than the security agents.

In the example shown in FIG. 5, the security manager 208 is deployed at DCS Level 3, and security agents 502-504 are scattered at Levels 1 and 2 in a different subnetwork. A security manager proxy 506 is selected as a node or multiple nodes at Level 2 that route security credentials between the security manager 208 at Level 3 and the security agents 502-504 at Levels 1 and 2. Similar to the manner described above with respect to the use of canned policies, two independent dedicated paths can be set up between the security agents and the security manager proxy 506, and two independent dedicated paths can be set up between the security manager proxy 506 and the security manager 208. This allows manager-agent communications to be established with a single hop at the proxy 506.

Two additional nodes 508-510 are shown in FIG. 5, one at Level 1 and another at Level 2/3. These nodes lack a security agent and can be configured to engage in only clear-text (open) communications. Thus, not all nodes of an industrial process control and automation system need to be configured with security agents.

Although FIG. 5 illustrates one example of a technique for routing security policies across subnetworks to support securing of a DCS, various changes may be made to FIG. 5. For example, any other suitable technique could be used to route security policies across subnetworks. Also, in other embodiments, security policies need not be routed across subnetworks.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, at a first distributed control system (DCS) node over a network, information associated with a security manager;
establishing multiple communication channels between the first DCS node and the security manager over the network using the information, the communication channels including a non-secure channel and a secure channel;
receiving security credentials from the security manager at the first DCS node over the non-secure channel;
receiving a security policy and an initial activation time from the security manager at the first DCS node over the secure channel;
performing a handshake operation with a second DCS node;
determining whether to adjust the initial activation time based on a result of the handshake operation with the second DCS node; and
transitioning the first DCS node to communicate with the second DCS node over the network using the security policy at one of: the initial activation time or an adjusted activation time.

2. The method of claim 1, wherein receiving the information associated with the security manager comprises:
transmitting a bootstrap protocol (BOOTP) request from the first DCS node to a BOOTP server; and
receiving a BOOTP response from the BOOTP server at the first DCS node, the BOOTP response including a network address of the security manager and identifiers of ports to be used to communicate with the security manager.

3. The method of claim 1, wherein establishing the multiple communication channels comprises:
establishing the non-secure channel with the security manager using a first predefined policy; and
establishing the secure channel with the security manager using a second predefined policy.

4. The method of claim 3, wherein establishing the multiple communication channels further comprises, after establishing the non-secure channel but before establishing the secure channel:
transmitting a join request from the first DCS node to the security manager over the non-secure channel; and
receiving a join response from the security manager at the first DCS node over the non-secure channel, the join response comprising a certificate that represents the security credentials.

5. The method of claim 4, wherein receiving the join response comprises receiving the join response from the security manager after a user approves the join request.

6. The method of claim 1, further comprising:
communicating with the security manager indirectly via a security proxy, the security proxy located in a subnetwork, the security manager located outside the subnetwork.

7. The method of claim 1, wherein performing the handshake operation comprises performing the handshake operation before transitioning the first DCS node to communicate with the second DCS node to verify that both the first and second DCS nodes are prepared to securely communicate with one another.

8. The method of claim 1, wherein:
the handshake operation comprises a four-way handshake that includes:
the first DCS node transmitting a first policy update message including the initial activation time to the second DCS node and receiving a first acknowledgement from the second DCS node; and
the first DCS node receiving a second policy update message from the second DCS node and transmitting a second acknowledgement to the second DCS node; and determining whether to adjust the initial activation time based on the result of the handshake operation with the second DCS node comprises determining whether to adjust the initial activation time based on whether the first and second acknowledgements were received in response to the first and second policy update messages, respectively.

9. An apparatus comprising:
a first distributed control system (DCS) node comprising:
  at least one interface configured to receive over a network information associated with a security manager; and
  at least one processing device configured to:
    establish multiple communication channels including a non-secure channel and a secure channel between the first DCS node and the security manager over the network using the information;
    receive security credentials from the security manager over the non-secure channel via the at least one interface;
    receive a security policy and an initial activation time from the security manager over the secure channel via the at least one interface;
    perform a handshake operation with a second DCS node;
    determine whether to adjust the initial activation time based on a result of the handshake operation with the second DCS node; and
    transition the at least one interface to communicate with the second DCS node over the network using the security policy at one of: the initial activation time or an adjusted activation time.

10. The apparatus of claim 9, wherein the at least one processing device is configured to:
  initiate transmission of a bootstrap protocol (BOOTP) request to a BOOTP server via the at least one interface; and
  receive a BOOTP response from the BOOTP server via the at least one interface, the BOOTP response including a network address of the security manager and identifiers of ports to be used to communicate with the security manager.

11. The apparatus of claim 9, wherein the at least one processing device is configured to:
  establish the non-secure channel with the security manager using a first predefined policy; and
  establish the secure channel with the security manager using a second predefined policy.

12. The apparatus of claim 11, wherein the at least one processing device is configured, after establishing the non-secure channel but before establishing the secure channel, to:
  initiate transmission of a join request to the security manager over the non-secure channel via the at least one interface; and
  receive a join response from the security manager over the non-secure channel via the at least one interface, the join response comprising a certificate that represents the security credentials.

13. The apparatus of claim 11, wherein the security policy is different from the first and second predefined policies.

14. The apparatus of claim 9, wherein the at least one processing device is configured to perform the handshake operation before transitioning the at least one interface to communicate with the second DCS node to verify that both the first and second DCS nodes are prepared to securely communicate with one another.

15. The apparatus of claim 9, wherein:
the handshake operation comprises a four-way handshake that includes:
  the first DCS node transmitting a first policy update message including the initial activation time to the second DCS node and receiving a first acknowledgement from the second DCS node; and
  the first DCS node receiving a second policy update message from the second DCS node and transmitting a second acknowledgement to the second DCS node; and
the at least one processing device is configured to determine whether to adjust the initial activation time based on whether the first and second acknowledgements were received in response to the first and second policy update messages, respectively.

16. A non-transitory computer readable medium embodying a computer program, the computer program comprising computer readable program code for:
  receiving, at a first distributed control system (DCS) node over a network, information associated with a security manager;
  establishing multiple communication channels between the first DCS node and the security manager over the network using the information, the communication channels including a non-secure channel and a secure channel;
  receiving security credentials from the security manager at the first DCS node over the non-secure channel;
  receiving a security policy and an initial activation time from the security manager at the first DCS node over the secure channel;
  performing a handshake operation with a second DCS node;
  determining whether to adjust the initial activation time based on a result of the handshake operation with the second DCS node; and
  transitioning the first DCS node to communicate with the second DCS node over the network using the security policy at one of: the initial activation time or an adjusted activation time.

17. The computer readable medium of claim 16, wherein the computer readable program code for receiving the information associated with the security manager comprises computer readable program code for:
  initiating transmission of a bootstrap protocol (BOOTP) request from the first DCS node to a BOOTP server; and
  receiving a BOOTP response from the BOOTP server at the first DCS node, the BOOTP response including a network address of the security manager and identifiers of ports to be used to communicate with the security manager.

18. The computer readable medium of claim 16, wherein the computer readable program code for establishing the multiple communication channels comprises computer readable program code for:
  establishing the non-secure channel with the security manager using a first predefined policy;
  initiating transmission of a join request from the first DCS node to the security manager over the non-secure channel;
  receiving a join response from the security manager at the first DCS node over the non-secure channel, the join response comprising a certificate that represents the security credentials; and establishing the secure channel with the security manager using a second predefined policy.

19. The computer readable medium of claim 16, wherein the computer readable program code for performing the handshake operation comprises:
   computer readable program code for performing the handshake operation before transitioning the first DCS node to communicate with the second DCS node to verify that both the first and second DCS nodes are prepared to securely communicate with one another.

20. The computer readable medium of claim 16, wherein:
   the handshake operation comprises a four-way handshake that includes:
      the first DCS node transmitting a first policy update message to the second DCS node and receiving a first acknowledgement from the second DCS node; and
      the first DCS node receiving a second policy update message from the second DCS node and transmitting a second acknowledgement to the second DCS node; and
   the computer readable program code for determining whether to adjust the initial activation time based on the result of the handshake operation with the second DCS node comprises computer readable program code for determining whether to adjust the initial activation time based on whether the first and second acknowledgements were received in response to the first and second policy update messages, respectively.

\* \* \* \* \*